(12) United States Patent
Lee

(10) Patent No.: US 8,254,434 B2
(45) Date of Patent: Aug. 28, 2012

(54) OFDM WIRELESS MOBILE COMMUNICATION SYSTEM AND METHOD FOR ESTIMATING SNR OF CHANNEL THEREOF

(75) Inventor: Keun-Moo Lee, Seongnam-si (KR)

(73) Assignee: XRONet Corporation, Gyeonggi-do (KR)

( * ) Notice: Subject to any disclaimer, the term of this patent is extended or adjusted under 35 U.S.C. 154(b) by 542 days.

(21) Appl. No.: 12/515,853

(22) PCT Filed: Nov. 29, 2007

(86) PCT No.: PCT/KR2007/006097
§ 371 (c)(1),
(2), (4) Date: May 21, 2009

(87) PCT Pub. No.: WO2008/066338
PCT Pub. Date: Jun. 5, 2008

(65) Prior Publication Data
US 2010/0054319 A1 Mar. 4, 2010

(30) Foreign Application Priority Data
Nov. 30, 2006 (KR) .................. 10-2006-0120188

(51) Int. Cl.
*H04B 3/46* (2006.01)
(52) U.S. Cl. ...................................... 375/227
(58) Field of Classification Search ........... None
See application file for complete search history.

(56) References Cited

U.S. PATENT DOCUMENTS

| | | | |
|---|---|---|---|
| 6,317,456 B1 | 11/2001 | Sayeed | |
| 2006/0013180 A1* | 1/2006 | Gupta et al. | 370/338 |
| 2006/0251198 A1* | 11/2006 | Ma et al. | 375/350 |
| 2008/0240217 A1* | 10/2008 | Lee et al. | 375/227 |

FOREIGN PATENT DOCUMENTS
KR 10200041010342 A 12/2004

OTHER PUBLICATIONS

Sandrine Boumard "Novel Noise Variance and SNR Estimation Algorithm for Wireless MIMO OFDM Systems", Dec. 2003, Global Telecommunications Conference, 2003. GLOBECOM 03. IEEE.*

(Continued)

*Primary Examiner* — David C. Payne
*Assistant Examiner* — Wednel Cadeau
(74) *Attorney, Agent, or Firm* — Daly, Crowley, Mofford & Durkee, LLP (57) ABSTRACT

In a method for estimating a signal-to-noise ratio (SNR) of an orthogonal frequency division multiplexing (OFDM) wireless mobile communication system, noise is estimated from adjacent received signals of at least two adjacent subcarriers and received signals of subcarriers, noise power is calculated by calculating a mean square value of the estimated noise by summing squares of the estimated noise, a mean square value of the received signals is calculated by summing squares of the received signals, signal power is calculated by subtracting the noise power from the mean square value of the received signals, and the SNR is calculated using the signal power and the noise power. Thus, the method of the present invention having low complexity can estimate an SNR efficiently regardless of channel changes on a frequency axis when one OFDM symbol includes preamble data.

7 Claims, 4 Drawing Sheets

OTHER PUBLICATIONS

Boumard, "Novel Noise Variance and SNR estimation Algorithm for Wireless MIMO OFDM Systems", Dec. 2003, Global Tlecommunication Coference, GLOBECOM '03, IEEE.*

PCT International Search Report dated Mar. 4, 2008 PCT/KR2007/006097.

Written Opinion of the International Searching Authority dated Mar. 4, 2008 PCT/KR2007/006097.

Huilin Xum Guo Wei, Jinkang Zhu, IEEE Xplore Release 2.6, A Novel SNR Estimation Algorithm for OFDM, May 30, 2005, Jun. 1, 2005, vol. 5, pp. 3068-3071, vol. 5.

* cited by examiner

OFDM WIRELESS MOBILE COMMUNICATION SYSTEM AND METHOD FOR ESTIMATING SNR OF CHANNEL THEREOF

TECHNICAL FIELD

The present invention relates to an orthogonal frequency division multiplexing (OFDM) wireless mobile communication system and a method for estimating a signal-to-noise ratio (SNR) of a channel thereof, and more particularly to a system and a method for estimating noise power using a preamble.

BACKGROUND ART

As interest related to Wireless Broadband (WiBro) systems, which use a 2.3 GHz band for Internet Protocol (IP)-based packet services, and $4^{th}$-generation (4G) mobile communication systems increases, active research is being conducted in order to satisfy requirements of the WiBro systems and the 4G mobile communication systems in relation to cell coverage and initial investment costs. Cell coverage may generally be affected by the efficiency of a control channel for synchronizing.

In particular, an orthogonal frequency division multiplexing (OFDM) technique has been proposed as a next-generation broadband wireless multiple access technique because the OFDM technique has strong characteristics against frequency-selective fading and narrow-band interference. In the OFDM technique, signals are transmitted simultaneously using different subcarriers by multiple users. The OFDM technique can transmit signals efficiently, and can compensate for channel distortions using a simple single-tab equalizer. In addition, the OFDM technique can solve intersymbol interference (ISI) problems easily using a cyclic prefix (CP). These advantages of the OFDM technique are why the OFDM technique is a suitable technique for 4G mobile communication systems.

Based on these advantages of the OFDM technique, active research is being conducted on an orthogonal frequency division multiple access (OFDMA, including OFDM-frequency division multiple access (OFDM-FDMA), OFDM-code division multiple access (OFDM-CDMA), and OFDM-time division multiple access (OFDM-TDMA)) system. The OFDMA system is a multi-user access system capable of satisfying various levels of quality of service (QoS). The OFDMA technique (or system) allocates different subcarriers to multiple users, respectively. Thus, the OFDMA technique can ensure various levels of QoS by allocating various resources according to requirements of users. The OFDMA technique has also been proposed as a next-generation broadband wireless multiple access technique because the OFDMA technique has strong characteristics against frequency-selective fading and narrow-band interference. The OFDMA technique uses a physical layer of the Institute of Electrical and Electronics Engineers (IEEE) 802.16a standard. The OFDMA technique is becoming highly associated with high-speed mobile Internet techniques being researched in South Korea. In addition, the OFDMA technique can be employed in 802.16e fixed or mobile Worldwide Interoperability for Microwave Access (WiMAX) systems or in 802.11 systems.

In mobile communication systems, a signal-to-noise ratio (SNR) of a received signal is an important estimated value, and the estimated value is used for various purposes. For example, the SNR can be a measure of quality for handoff signals. A receiver can use the SNR in adaptive modulation and coding (AMC) after receiving the SNR (as feedback) related to current wireless conditions. The SNR can be used for calculating a log-likelihood ratio for the receiver. In addition, the SNR can be used for a power control technique, a call setup technique, a diversity technique, etc.

In order to estimate the SNR, the transmitter has to transmit signals using predetermined data patterns that the receiver can recognize. The signals may include a preamble or a pilot so that the receiver may estimate the SNR using the preamble or the pilot.

For example, a WiBro system using the OFDM modulation technique uses three segments. A preamble data sequence having a length of 284 according to each segment is transmitted using the first OFDM symbol of a down-link frame.

When N of the predetermined data that the receiver can recognize are transmitted from the transmitter and pass through a fading channel, received signals that the receiver receives are expressed as [Expression 1].

$$y_k = H_k x_{prmb,k} + n_k \quad k = 0, 1, \ldots, N-1 \qquad \text{[Expression 1]}$$

(Here, k denotes the subcarrier index of the OFDM, $y_k$ denotes received signals in a kth subcarrier in a frequency domain of the OFDM, $H_k$ denotes a channel used by the kth subcarrier, $x_{prmb,k}$ denotes a signal in the frequency domain transmitted from a transmitter, and $n_k$ denotes a noise signal added to the kth subcarrier.)

If $|x_{prmb,k}|^2 = 1$, an estimated SNR is expressed as [Expression 2].

$$SNR = \frac{E(|H_k|^2)}{E(|n_k|^2)} \qquad \text{[Expression 2]}$$

In [Expression 1], $x_{prmb,k}$ is a predetermined data pattern. $H_k$ and $n_k$ are unknown values. Thus, the SNR is estimated under conditions in which two unknown variables exist per each subcarrier.

Usually, methods for estimating the SNR are divided into a method using a channel estimation result and a blind-type algorithm that does not use a channel estimation result.

In the method using a channel estimation result, noise power is estimated by calculating $\hat{H}_k$ first and by calculating $n_k$ later using [Expression 3].

$$n_k = y_k - \hat{H}_k x_{prmb,k} \quad k = 0, 1, \ldots, N-1 \qquad \text{[Expression 3]}$$

$$E(|n_k|^2) = \sum_k |n_k|^2 = \sum_k |y_k - \hat{H}_k x_{prmb,k}|^2 \qquad \text{[Expression 4]}$$

The efficiency of the method using the channel estimation is determined by the accuracy of $\hat{H}_k$. That is, the efficiency of the SNR estimation is determined by whether $\hat{H}_k$ is estimated accurately.

The noise power cannot be estimated by a usual least square method having low complexity. If $\hat{H}_k$ is estimated using the least square method, $\hat{H}_k$ is estimated using [Expression 5]. Thus, the result is zero when [Expression 5] is substituted with [Expression 4], and thus the noise power cannot be estimated.

$$\hat{H}_k = \frac{(x_{pmb,k})^*}{|x_{pmb,k}|^2} y_k \qquad \text{[Expression 5]}$$

Therefore, the channel has to be estimated by reducing much noise using a minimum mean square error (MMSE) method or a method having high complexity. In addition, the noise power has to be estimated using the estimated channel.

The blind-type algorithm is a method that estimates the noise power without estimating $\hat{H}_k$. In a wireless local area network (WLAN) system in which the preambles are in two OFDM symbols, the noise power can be estimated using [Expression 6] if the channel is riot changed on a time axis.

$$E(|n_k|^2) = \frac{1}{2N} \sum_k |y_{0,k} - y_{1,k}|^2 \qquad \text{[Expression 6]}$$

(Here, $y_{0,k}$ denotes received signals in a kth subcarrier of the first OFDM symbol, and $y_{1,k}$ denotes received signals in a kth subcarrier of the second OFDM symbol.)

The estimation of the noise power using [Expression 6] is based on the assumption that $y_{0,k}$ and $y_{1,k}$ use the same channel. Thus, the efficiency is low when the channel is changed on the time axis due to movements of the receiver, etc.

In an 802.16e mobile WiMAX system, only one OFDM symbol includes preamble data. Thus, the blind-type algorithm cannot be employed in the 802.16e mobile WiMAX system.

Therefore, the noise power may be estimated using [Expression 7] if the channel change is small on a frequency axis.

$$E(|n_k|^2) = \frac{1}{2(N-1)} \sum_k |y_k - y_{k+1}|^2 \qquad \text{[Expression 7]}$$

The efficiency of a method using [Expression 7] is low because the channel changes quickly on the frequency axis when the delay spread of the channel is long.

DISCLOSURE OF THE INVENTION

Technical Problem

Accordingly, the present invention is provided to substantially obviate one or more problems due to limitations and disadvantages of the related art.

Some example embodiments of the present invention provide an orthogonal frequency division multiplexing (OFDM) wireless mobile communication system that can estimate a signal-to-noise ratio (SNR) efficiently without a channel estimation having high complexity, and a method for estimating SNR thereof.

Some example embodiments of the present invention provide a system and a method that can estimate noise power when only one OFDM symbol includes preamble data.

Some example embodiments of the present invention provide a system and a method that can estimate an SNR efficiently with a channel estimation having low complexity even though a channel is changed on the frequency axis.

Technical Solution

In the method of the present invention, noise is estimated from adjacent received signals of at least two adjacent subcarriers and received signals of subcarriers, noise power is calculated by calculating a mean square value of the estimated noise by summing squares of the estimated noise, a mean square value of the received signals is calculated by summing squares of the received signals, signal power is calculated by subtracting the noise power from the mean square value of the received signals, and the SNR is calculated using the signal power and the noise power.

The wireless mobile communication system may be an OFDM system that transmits a preamble using one OFDM symbol. In addition, the OFDM system may be a Wireless Broadband (WiBro) system or a Worldwide Interoperability for Microwave Access (WiMAX) system. Further, the wireless mobile communication system may be an 802.11 wireless local area network (WLAN) system that transmits a preamble using one OFDM symbol.

The present invention estimates noise by using adjacent received signals of adjacent subcarriers. The present invention includes two estimation modes according to the number of the adjacent subcarriers used for estimating the noise. The estimation mode is selected according to the size of a delay spread.

When the delay spread is relatively small (a first example embodiment), the adjacent received signals $y_{k-1}$ and $y_{k+1}$ of two adjacent subcarriers $sc_{k-1}$ and $sc_{k+1}$ are used. That is, when noise is estimated, components of the adjacent received signals $y_{k-1}$ and $y_{k+1}$ are derived from the adjacent received signals $y_{k-1}$ and $y_{k+1}$ of adjacent subcarriers $sc_{k-1}$ and $sc_{k+1}$, and the components of the adjacent received signals $y_{k-1}$ and $y_{k+1}$ are subtracted from received signals $y_k$ of subcarriers $sc_k$.

In the first example embodiment, the noise power is calculated using [Expression 8], and the signal power is calculated using [Expression 9].

$$N_{pow} = \frac{2}{3(N-2)} \sum_k \left| y_k - \frac{1}{2}(y_{k-1} + y_{k+1}) \right|^2 \qquad \text{[Expression 8]}$$

(Here, $N_{pow}$ denotes the noise power, and ⅔ denotes a scaling down value.)

$$S_{pow} = \frac{1}{N-2} \sum_k |y_k|^2 - N_{pow} \qquad \text{[Expression 9]}$$

(Here, $S_{pow}$ denotes the signal power.)

When the delay spread is relatively large (a second example embodiment), the adjacent received signals $y_{k-2}$, $y_{k-1}$, $y_{k-1}$, and $y_{k+2}$ of four adjacent subcarriers $sc_{k-2}$, $sc_{k-1}$, $sc_{k+1}$, and $sc_{k+2}$ are used. That is, when noise is estimated, components of the adjacent received signals $y_{k-2}$, $y_{k-1}$, $y_{k+1}$, and $y_{k+2}$ are derived from the adjacent received signals $y_{k-2}$, $y_{k-1}$, $y_{k+1}$, and $y_{k+2}$ of adjacent subcarriers $sc_{k-2}$, $sc_{k-1}$, $sc_{k+1}$, and $sc_{k+2}$, and the components of the adjacent received signals $y_{k-2}$, $y_{k-1}$, $y_{k+1}$, and $y_{k+2}$ are subtracted from received signals $y_k$ of subcarriers $sc_k$.

In the second example embodiment, the noise power is calculated using [Expression 10], and the signal power is calculated using [Expression 11].

$$N_{pow} = \frac{18}{35(N-4)} \sum_k \left| y_k - \left( \frac{2}{3}(y_{k-1} + y_{k+1}) - \frac{1}{6}(y_{k-2} + y_{k+2}) \right) \right|^2 \quad \text{[Expression 10]}$$

(Here, $N_{pow}$ denotes the noise power, and $\tfrac{2}{3}$, $\tfrac{1}{6}$, and $\tfrac{18}{35}$ denote scaling down values.)

$$S_{pow} = \frac{1}{N-4} \sum_k |y_k|^2 - N_{pow} \quad \text{[Expression 11]}$$

(Here, $S_{pow}$ denotes the signal power.)

[Expression 10] is derived as below.

If four pairs of data (x, y) are given, second order polynomial fitting is performed in order to minimize an error using $f(x) = p_2 x^2 + p_1 x + p_0$. If given data is $(x_i, y_i)$, the error may be calculated using [Expression 12].

$$e^2 = \sum_{i=1}^{4} |y_i - f(i)|^2 \quad \text{[Expression 12]}$$

$$= \sum_{i=1}^{4} |y_i - (p_2 x_i^2 + p_1 x_i + p_0)|^2$$

The error is minimized when $P = [p_2 \; p_1 \; p_0]^2$ is differentiated and the differentiation result is zero as in [Expression 13].

$$\frac{\partial e^2}{\partial p_2} = 2 \cdot \sum_{i=1}^{4} (y_i - (p_2 x_i^2 + p_1 x_i + p_0)) \cdot x_i^2 = 0 \quad \text{[Expression 13]}$$

$$\frac{\partial e^2}{\partial p_1} = 2 \cdot \sum_{i=1}^{4} (y_i - (p_2 x_i^2 + p_1 x_i + p_0)) \cdot x_i = 0$$

$$\frac{\partial e^2}{\partial p_0} = 2 \cdot \sum_{i=1}^{4} (y_i - (p_2 x_i^2 + p_1 x_i + p_0)) \cdot x_i^2 = 0$$

[Expression 13] may be transformed to [Expression 14] as a matrix equation.

$$\begin{bmatrix} \sum x_i^4 & \sum x_i^3 & \sum x_i^2 \\ \sum x_i^3 & \sum x_i^2 & \sum x_i \\ \sum x_i^2 & \sum x_i & 1 \end{bmatrix} \begin{bmatrix} p_2 \\ p_1 \\ p_0 \end{bmatrix} = \begin{bmatrix} \sum y_i x_i^2 \\ \sum y_i x_i \\ \sum y_i \end{bmatrix} \quad \text{[Expression 14]}$$

Thus, [Expression 14] may be transformed to [Expression 15].

$$\begin{bmatrix} p_2 \\ p_1 \\ p_0 \end{bmatrix} = \left( \begin{bmatrix} \sum x_i^4 & \sum x_i^3 & \sum x_i^2 \\ \sum x_i^3 & \sum x_i^2 & \sum x_i \\ \sum x_i^2 & \sum x_i & 1 \end{bmatrix} \right)^{-1} \cdot \begin{bmatrix} \sum y_i x_i^2 \\ \sum y_i x_i \\ \sum y_i \end{bmatrix} \quad \text{[Expression 15]}$$

The value of $f(0)$ is $p_0$ when x is zero. [Expression 16] may be derived by substituting $(-2, y-2)$, $(-1, y-1)$, $(+1, y+1)$, and $(+-2, y+2)$ to [Expression 16].

$$f(0) = p_0 = \frac{2}{3}(y_{-1} + y_{+1}) - \frac{1}{6}(y_{-2} + y_{+2}) \quad \text{[Expression 16]}$$

The noise is estimated using [Expression 10] and [Expression 16]. The system of the present invention includes an SNR estimator. The SNR estimator may include a noise estimation unit configured to estimate noise by using adjacent received signals of at least two adjacent subcarriers and received signals of a kth subcarrier, a noise power calculation unit configured to calculate noise power by calculating a mean square value of the estimated noise by summing squares of the estimated noise for a certain period of time, a received signal calculation unit configured to calculate a mean square value of the received signals by summing squares of the received signals for the certain period of time, a signal power calculation unit configured to calculate signal power by subtracting the calculated noise power from the mean square value of the received signals, and an SNR calculation unit configured to calculate an SNR from the signal power and the noise power.

The SNR estimator may further include a mode selection unit configured to adaptively control the number of the adjacent signals of the adjacent subcarriers in accordance with the size of a delay spread. The adjacent signals of the adjacent subcarriers are provided to the noise estimation unit.

The mode selection unit may determine that the number of the adjacent received signals of the adjacent subcarriers provided to the noise estimation unit is two when the delay spread is relatively small, and may determine that the number of the adjacent received signals of the adjacent subcarriers provided to the noise estimation unit is four when the delay spread is relatively large.

BEST MODE FOR CARRYING OUT THE INVENTION

Embodiments of the present invention now will be described more fully with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Hereinafter, the present invention will be described in detail with reference to the accompanying drawings.

Figure 1:
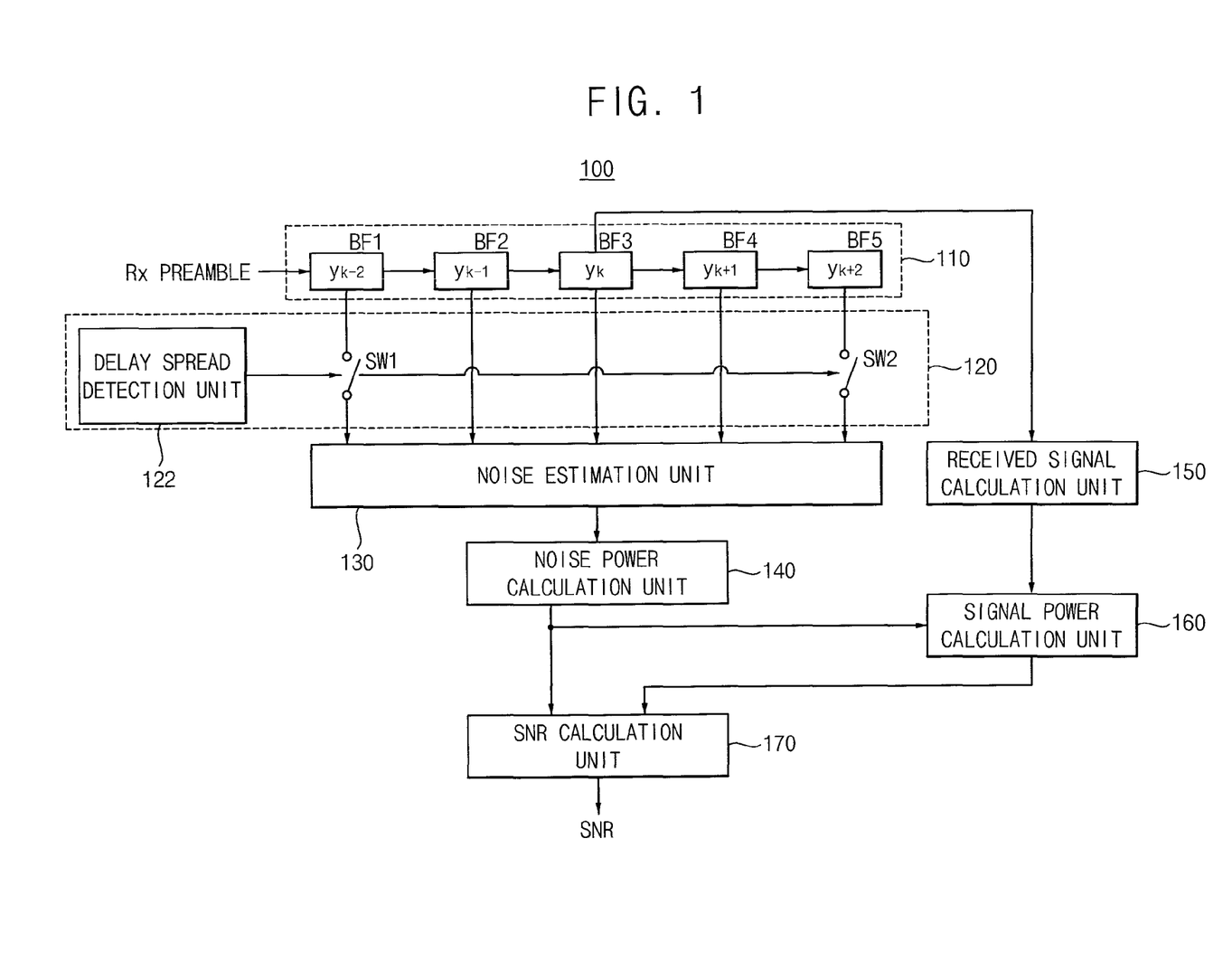
FIG. 1 is a block diagram illustrating a signal-to-noise ratio (SNR) estimator in an orthogonal frequency division multiplexing (OFDM) wireless communication system according to an example embodiment of the present invention.

FIG. 1 is a block diagram illustrating a signal-to-noise ratio (SNR) estimator in an orthogonal frequency division multiplexing (OFDM) wireless communication system according to an example embodiment of the present invention.

Referring to FIG. 1, the system 100 includes an input buffer unit 110, a mode selection unit 120, a noise estimation unit 130, a noise power calculation unit 140, a received signal calculation unit 150, a signal power calculation unit 160, and an SNR calculation unit 170.

The input buffer unit 110 sequentially buffers preamble data in subcarriers using five buffers BF1, BF2, BF3, BF4, and BF5. Thus, each of the five buffers BF1, BF2, BF3, BF4, and BF5 stores received signals and adjacent received signals yk−2, yk−1, yk, yk+1, and yk+2, respectively.

The mode selection unit 120 includes a delay spread detection unit 122 and switches SW1 and SW2. When a delay spread detected by the delay spread detection unit 122 is relatively small, the switches SW1 and SW2 turn off. When the delay spread detected by the delay spread detection unit 122 is relatively large, the switches SW1 and SW2 turn on. Thus, when the delay spread is relatively small, the received signals yk and the adjacent received signals yk−1. and yk+1 are provided to the noise estimation unit 130. When the delay spread is relatively large, the received signals yk and the adjacent received signals yk−2, yk−1, yk+1, and yk+2 are provided to the noise estimation unit 130.

The noise estimation unit 130 estimates noise using the received signals and the adjacent received signals.

The noise power calculation unit 140 receives the estimated noise from the noise estimation unit 130, and calculates noise power by calculating a mean square value of the estimated noise by summing squares of the estimated noise.

The received signal calculation unit 150 receives the received signals yk provided from the buffer BF3 in the input buffer unit 110, and calculates a mean square value of the received signals yk by summing squares of the received signals yk.

The signal power calculation unit 160 receives the mean square of the received signals from the received signal calculation unit 150, receives the noise power from the noise power calculation unit 140, and calculates signal power by subtracting the noise power from the mean square value of the received signals.

The SNR calculation unit 170 calculates an SNR using the noise power provided from the noise power calculation unit 140 and the signal power provided from the signal power calculation unit 160.

Figure 2:
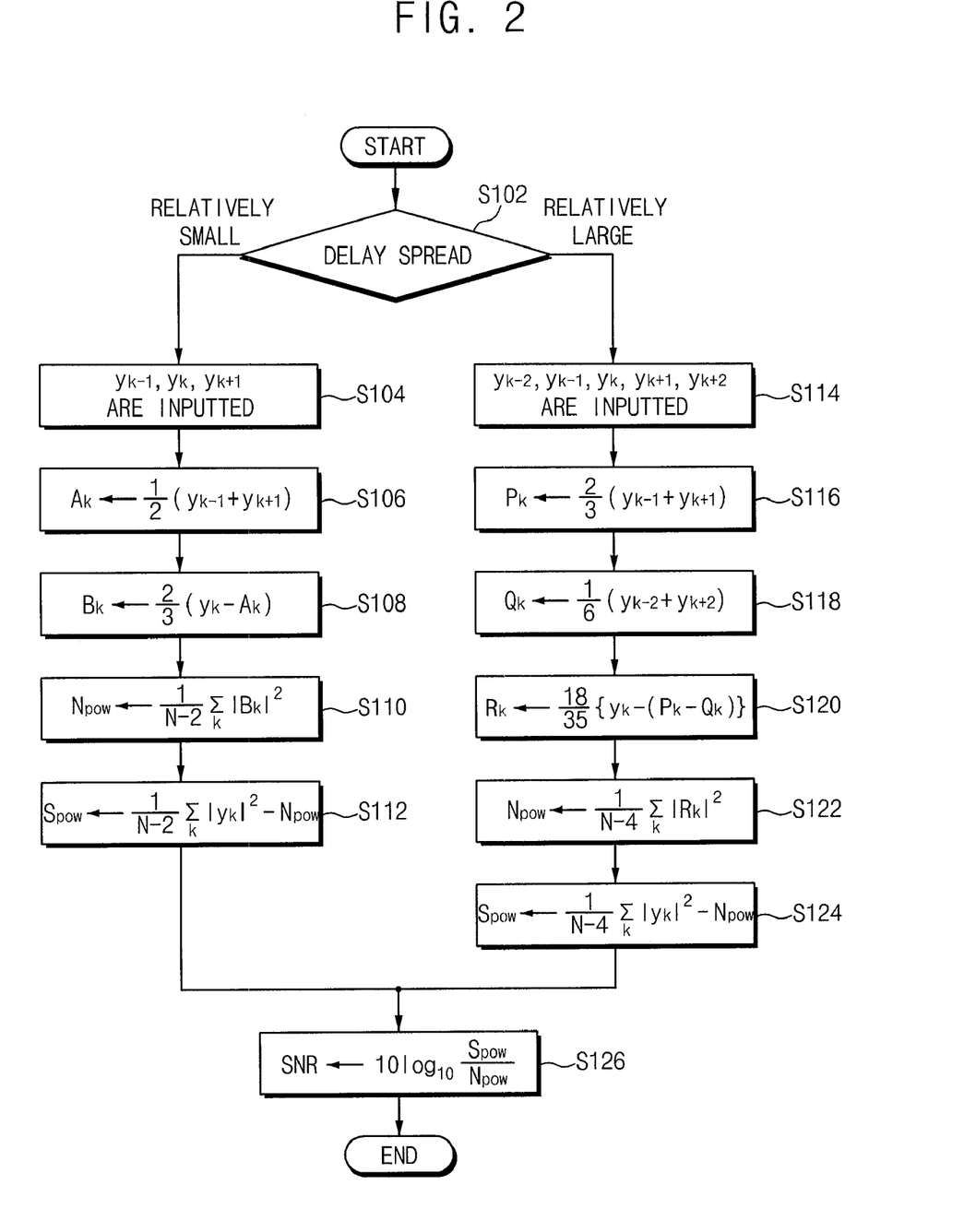
FIG. 2 is a flowchart illustrating a method for estimating an SNR of an OFDM wireless communication system according to an example embodiment of the present invention.

FIG. 2 is a flowchart illustrating a method for estimating an SNR of an OFDM wireless communication system according to an example embodiment of the present invention.

The operation of the present invention will be described with reference to FIG. 2. The system 100 receives preamble data in subcarriers sck−2, sck−1, sck, sck+1, and sck+2 received through antennas, and sequentially stores received signals and adjacent received signals yk−2, yk−1, yk, yk+1, and yk+2 in buffers BF1, BF2, BF3, BF4, and BF5 in the input buffer unit 110.

The mode selection unit 120 determines whether a delay spread is relatively small or large using the delay spread detection unit 122, and controls switches SW1 and SW2 according to the size of the delay spread (step S102).

When the delay spread is relatively small, the switches SW1 and SW2 turn off. Thus, the adjacent received signals yk−2 and yk+2 are not provided to the noise estimation unit 130. In the result, the received signals and the adjacent received signals yk−1, yk, and yk+1 are provided to the noise estimation unit 130 (step S104).

The noise estimation unit 130 performs a linear interpolation of the adjacent received signals yk−1 and yk+1. That is, the noise estimation unit 130 calculates average values Ak of the adjacent received signals yk−1 and yk+1 (step S106). Then, the noise estimation unit 130 estimates noise Bk by subtracting the average values Ak from the received signals yk and by scaling down the subtraction result by ⅔ (step S108). The scaling down is performed for compensating the subtraction result because a power level of the subtraction result is 1.5 times than a noise power level.

The noise power calculation unit 140 calculates noise power Npow (step S110) by calculating a mean square value of the estimated noise Bk by summing squares of the estimated noise Bk N−2 times.

Here, N is 284 in the case of a Wireless Broadband (WiBro) system.

According to mobile Internet standards, the number of preamble patterns is 114 (i.e., 32×3+18) because the preamble includes 32 ID cells as indexes for partitioning stations (i.e., a base station or a radio access station), 3 segments as indexes for partitioning 3 sectors in one station (or one cell), and 18 preamble patterns that include 6 ID cells and 3 segments. Thus, the location of a mobile device can be checked by each station using the different preamble patterns (a standard unit of the number of the preamble patterns is 114). The number of subcarriers without 'null' subcarriers is 864 (the total number of subcarriers is 1,024). Among the 864 subcarriers, only 284 subcarriers include data, and 'null' is mapped to the other subcarriers. A preamble data sequence having a length of 284 according to each segment is transmitted using the first OFDM symbol of a down-link frame.

The received signal calculation unit 150 receives the received signals yk from the input buffer unit 110, and calculates a mean square value of the received signals yk by summing squares of the received signals yk N−2 times. The signal power calculation unit 160 calculates noise power Spow by subtracting the noise power Npow by the mean square value of the received signals yk (step S112).

The signal power Spow and the noise power Npow are provided to an SNR calculation unit 170 that calculates an SNR (step S126).

When the delay spread is relatively large (step S102), the switches SW1 and SW2 turn on. Thus, the received signals and the adjacent received signals yk−2, yk−1, yk, yk+1, and yk+2 are provided to the noise estimation unit 120 (step S114).

The noise estimation unit 130 performs a second order polynomial fitting of the adjacent received signals yk−2, yk−1, yk+1, and yk+2. The noise estimation unit 130 sums the adjacent received signals yk−1 and yk+1 to generate first sum values, and scales down the first sum values by ⅔ to generate values Pk (step S116). The noise estimation unit 130 sums the adjacent received signals yk−2 and yk+2 to generate second sum values, and scales down the second sum values by ⅙ to generate values Qk (step s118). Then, The noise estimation unit 130 subtracts the values Pk from the received signals yk, adds the values Qk to the subtraction result, and scales down the summation result by 18/35 to estimate noise Rk (step S120). The scaling down is performed for compensating the subtraction result because a power level of the subtraction result is 35/18 times than a noise power level.

The noise power calculation unit 140 calculates noise power Npow (step S112) by calculating a mean square value of the estimated noise Rk by summing squares of the estimated noise N−4 times.

The received signal calculation unit 150 receives the received signals yk from the input buffer unit 110, and calculates a mean square value of the received signals yk by summing squares of the received signals yk N−4 times. The signal power calculation unit 160 calculates noise power Spow by subtracting the noise power Npow by the mean square value of the received signals yk (step S124).

The signal power Spow and the noise power Npow are provided to an SNR calculation unit 170 that calculates an SNR (step S126).

Figure 3:
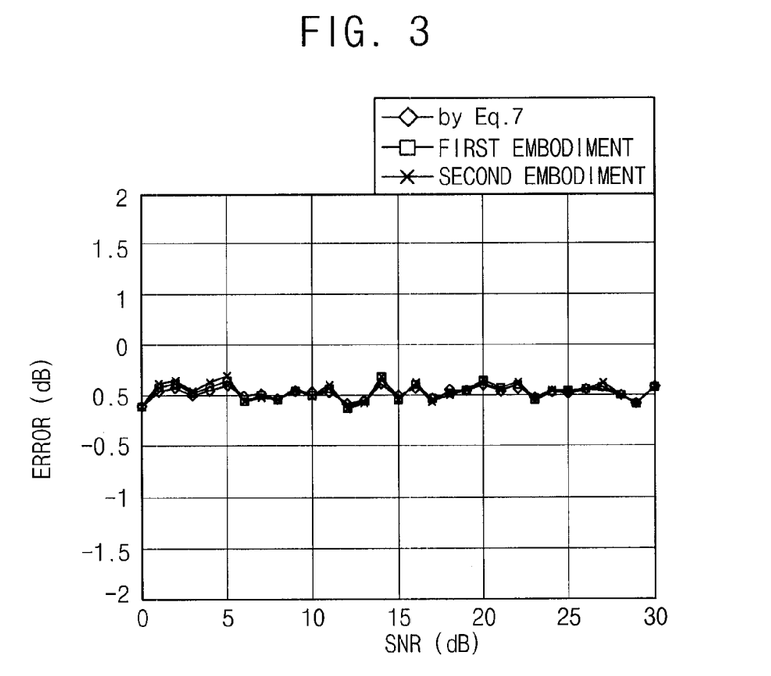
FIGS. 3 through 5 are graphs illustrating comparison results of efficiencies of SNR estimators in an OFDM wireless communication system.
Figure 4:
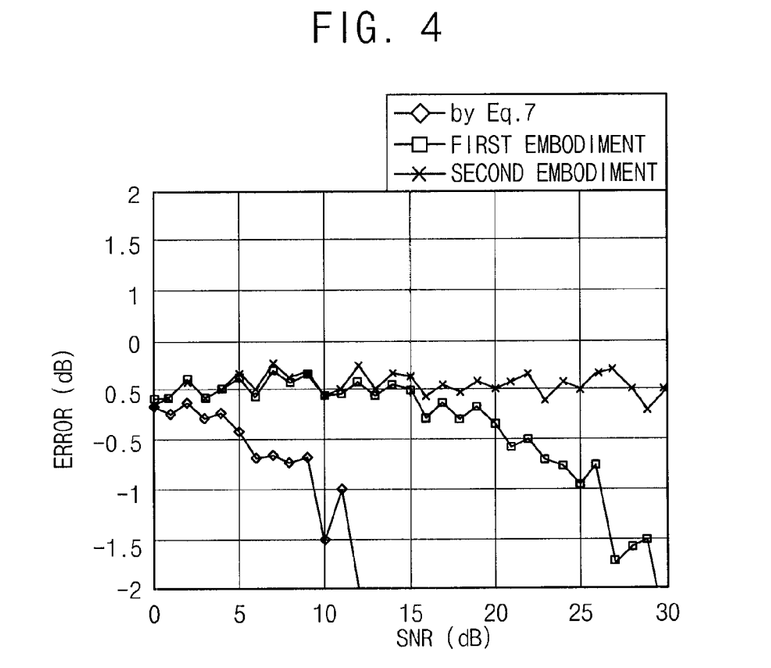
Figure 5:
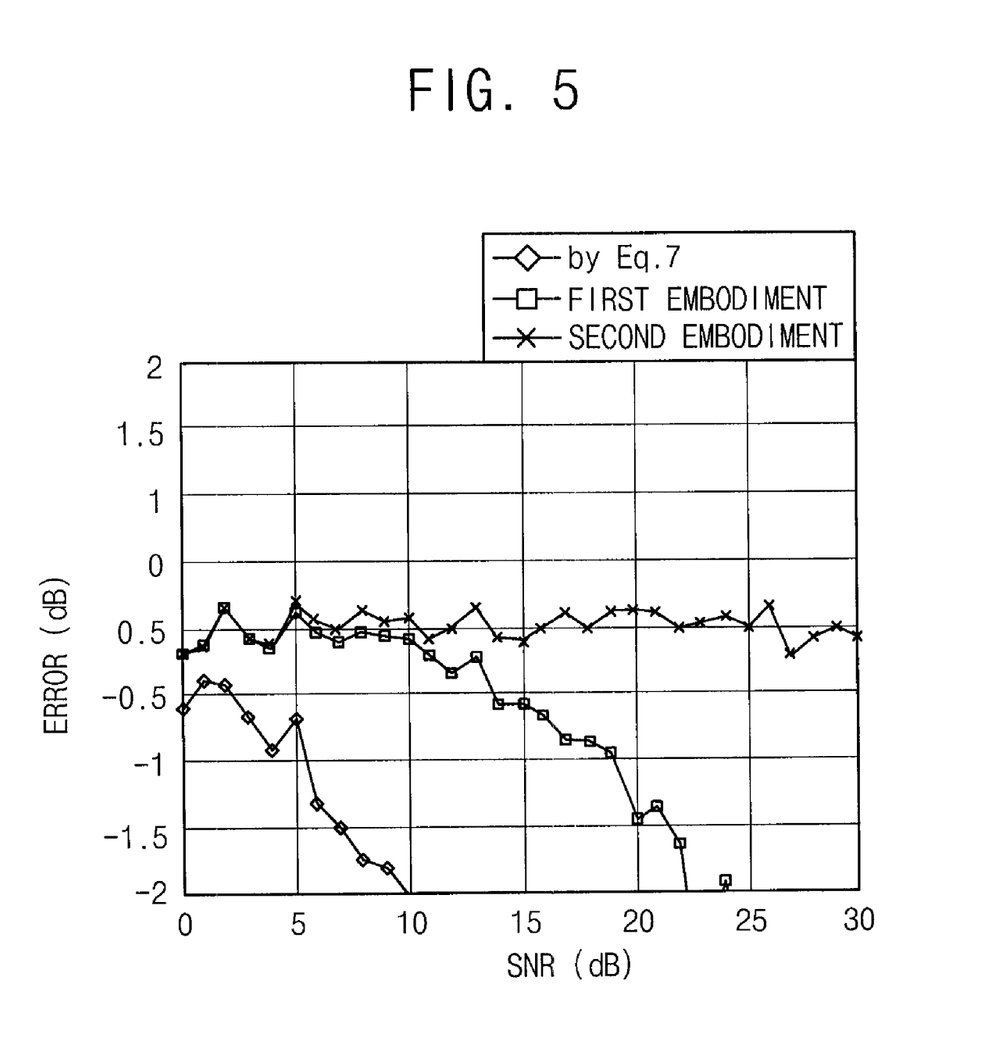

FIGS. 3 through 5 are graphs illustrating comparison results of efficiencies of SNR estimators in an OFDM wireless communication system.

The simulation of the present invention was performed by employing a method of the present invention in a WiBro system as a subset of an 802.16e OFDM system. One preamble data existed per three subcarriers, and the length of the preamble data was 284. An additive white Gaussian noise (AWGN) channel model and three ITU-R channel models were used as a channel. A result simulated by a method using [Expression 7] was plotted for comparison. Average values of SNR errors for ten frames were used in order to measure the efficiency. (The SNR in FIGS. 3 through 5 is a converted SNR of data because preamble data was boosted by 9 dB compared to the data.)

FIG. 3 shows the average errors in an AWGN channel. The three methods were all efficient because the average errors at 20 dB were substantially higher than −0.5 dB.

FIG. 4 shows the average errors in the International Telecommunication Union (ITU) Vehicular A (Veh. A) channel, a 30 km/h channel. The average error of the first example embodiment of the present invention was substantially higher than 0.5 dB at 20 dB because a delay spread became substantially larger. However, the second embodiment of the present invention operated efficiently.

FIG. 5 shows the average errors in the ITU Pedestrian B (Ped. B) channel, a 3 km/h channel. When the SNR became larger, only the second embodiment of the present invention maintained an average estimated error of less than 0.5 dB in Ped. B, a 3 km/h channel that has a relatively larger delay spread.

Industrial Applicability

As described above, the present invention having low complexity may be efficient in an orthogonal frequency division multiplexing (OFDM) system in which a preamble is transferred using one OFDM symbol. Thus, the present invention may be easily employed in a Wireless Broadband (WiBro) system and a mobile Worldwide Interoperability for Microwave Access (WiMAX) system.

In addition, the present invention may maintain high efficiency regardless of fast changes of a frequency axis because the present invention may adaptively change a mode according to the size of a delay spread.

The OFDM wireless mobile communication system and the method for estimating a signal-to-noise ratio (SNR) of a channel thereof according to example embodiments of the present invention may be employed in wireless communication systems.

While the example embodiments of the present invention and their advantages have been described in detail, it should be understood that various changes, substitutions and alterations may be made herein without departing from the scope of the invention.

What is claimed is:

1. A method for estimating a signal-to-noise ratio (SNR) of a wireless mobile communication system, comprising:
estimating noise by using adjacent received signals of at least two adjacent subcarriers and received signals of subcarriers;
calculating noise power by calculating a mean square value of the estimated noise by summing squares of the estimated noise;
calculating a mean square value of the received signals by summing squares of the received signals;
calculating signal power by subtracting the noise power from the mean square value of the received signals; and
calculating the SNR using the signal power and the noise power,
wherein estimating the noise includes:
deriving components of adjacent received signals from adjacent received signals of adjacent subcarriers; and
subtracting the components of the adjacent received signals from received signals of subcarriers,
wherein the subcarriers are sck, the received signals are yk, the adjacent subcarriers are sck−1 and sck+1, and the adjacent received signals are yk−1 and yk+1, and
wherein the noise power is calculated using a first expression:

$$N_{pow} = \frac{2}{3(N-2)} \sum_k \left| y_k - \frac{1}{2}(y_{k-1} + y_{k+1}) \right|^2,$$

where $N_{pow}$ denotes the noise power, and ⅔ denotes a scaling down value.

2. The method of claim 1, wherein the wireless mobile communication system is an orthogonal frequency division multiplexing (OFDM) system that transmits a preamble using one OFDM symbol.

3. The method of claim 2, wherein the OFDM system is a Wireless Broadband (WiBro) system or a Worldwide Interoperability for Microwave Access (WiMAX) system.

4. The method of claim 1, wherein the wireless mobile communication system is an 802.11 wireless local area network (WLAN) system that transmits a preamble using one OFDM symbol.

5. The method of claim 1, wherein the signal power is calculated using a second expression:

$$S_{pow} = \frac{1}{N-2} \sum_k |y_k|^2 - N_{pow} \qquad \text{[Expression B]}$$

where $S_{pow}$ denotes the signal power.

6. A method for estimating a signal-to-noise ratio (SNR) of a wireless mobile communication system, comprising:
   estimating noise by using adjacent received signals of at least two adjacent subcarriers and received signals of subcarriers;
   calculating noise power by calculating a mean square value of the estimated noise by summing squares of the estimated noise;
   calculating a mean square value of the received signals by summing squares of the received signals;
   calculating signal power by subtracting the noise power from the mean square value of the received signals; and
   calculating the SNR using the signal power and the noise power,
   wherein estimating the noise includes:
      deriving components of adjacent received signals from adjacent received signals of adjacent subcarriers; and
      subtracting the components of the adjacent received signals from received signals of subcarriers,
   wherein the subcarriers are sck, the received signals are yk, the adjacent subcarriers are sck−2, sck−1, sck+1, and sck+2, and the adjacent received signals are yk−2, yk−1, yk+1, and yk+2, and
   wherein the noise power is calculated using a first expression:

$$N_{pow} = \frac{18}{35(N-4)} \sum_k \left| y_k - \left( \frac{2}{3}(y_{k-1} + y_{k+1}) - \frac{1}{6}(y_{k-2} + y_{k+2}) \right) \right|^2,$$

where, $N_{pow}$ denotes the noise power, and ⅔, ⅙, and 18/35 denote scaling down values.

7. The method of claim 6, wherein the signal power is calculated using a second expression:

$$S_{pow} = \frac{1}{N-4} \sum_k |y_k|^2 - N_{pow} \qquad \text{[Expression D]}$$

where $S_{pow}$ denotes the signal power.

* * * * *